United States Patent [19]

Kamon et al.

[11] Patent Number: 4,634,933
[45] Date of Patent: Jan. 6, 1987

[54] PHOTOGRAPHIC ILLUMINATION APPARATUS

[75] Inventors: Akio Kamon, Tokyo; Yukio Odaka, Kanagawa, both of Japan

[73] Assignee: Kabushiki Kaisha Sunpak, Tokyo, Japan

[21] Appl. No.: 678,264

[22] Filed: Dec. 5, 1984

[51] Int. Cl.$^4$ .................................. H05B 37/02
[52] U.S. Cl. .................... 315/151; 250/205; 315/156; 315/194; 315/307
[58] Field of Search ............... 315/156, 158, 159, 151, 315/199, 194, 307

[56] References Cited

U.S. PATENT DOCUMENTS

| | | | |
|---|---|---|---|
| 3,684,919 | 8/1972 | Cramer | 315/194 |
| 4,190,795 | 2/1980 | Schultheis | 315/158 |
| 4,250,488 | 2/1981 | Haupt | 250/205 |
| 4,275,335 | 6/1981 | Ishida | 315/241 P |
| 4,346,331 | 8/1982 | Hoge | 315/158 |
| 4,396,869 | 8/1983 | Rosenbaum et al. | 315/194 |

Primary Examiner—Harold Dixon
Attorney, Agent, or Firm—Neuman, Williams, Anderson & Olson

[57] ABSTRACT

The present invention provides a photographic lighting apparatus for illuminating a photographic object in taking the object with a camera such as a television camera or an 8 mm movie camera. The photographic lighting apparatus is capable of illuminating the object practically at a fixed intensity of illumination regardless of the variation of the distance between the object and the lamp thereof by reducing the brightness of the lamp when the object is located near to the lamp and increasing the same when the object is located remotely. The brightness of the lamp is regulated by controlling the conduction angle of a thyristor connected to the lamp according to the output signal of a photometric circuit which measures the intensity of illumination of the object.

5 Claims, 3 Drawing Figures

PHOTOGRAPHIC ILLUMINATION APPARATUS

BACKGROUND OF THE INVENTION

This invention relates to photographic illumination apparatus and more particularly to apparatus for use with motion picture or television cameras. The apparatus of the invention provides proper illumination during varying conditions and is operative to prevent excessive illumination of human objects while being highly reliable.

It is conventional practice in photography to illuminate an object by simply energizing a lamp such as a halogen lamp and to control the exposure time to compensate for variations in brightness caused by variations in the distance between the lamp and the object. Thus the lamp may be of a large size with a high luminous intensity to permit illumination of a remote object, at a large distance from the lamp, the exposure time being reduced at shorter distances.

There are problems with such prior practices which have not been fully recognized and dealt with in the prior art. An object at a short distance may be subjected to very high intensity illumination and intense heat and when a human subject is photographed, he or she may be so dazzled as to frustrate the purpose of the photographic operation. Similar problems may be encountered in attempting to photograph animals. Relative movements of subjects or objects toward or away from the lamp, or passage of objects between the lamp and an object or subject, may also present problems which are aggravated by the slow response of automatic exposure mechanisms of cameras. In photographing with television cameras, temporary blanks of the viewing screen, retention of images for sustained times and other undersirable phenomena may occur.

SUMMARY OF THE INVENTION

This invention was evolved with the general object of improving the illumination of subjects or objects while photographing with motion picture or television cameras, and an important aspect of the invention is in the recognition of the aforementioned problems with prior art practices.

Accordingly, a specific object of the invention is to provide photographic illumination apparatus which will avoid exposure of a subject to dazzling light or intense heat and which will otherwise promote the attainment of desired photographic effects.

Another object of the invention is to provide photographic illumination apparatus which will facilitate the attainment of the correct exposure even when there is a sudden change in the distance between a lamp of the apparatus and a subject or object being photographed.

In accordance with the invention, the brightness of a lamp is reduced when the lamp is located near a subject or object and is increased when the lamp is located far from the subject or object, to obtain generally uniform illumination of the subject or object.

In preferred embodiments of the invention, a thyristor is connected between a lamp and a power source and the conduction angle of the thyristor is controlled in accordance with the intensity of illumination of a subject or object to control the energization of the lamp and thereby control its brightness and the illumination of the subject or object. The conduction angle of the thyristor is controlled from the output of a comparator which compares a reference voltage with that developed by a photometric in response to light reflected from the subject or object being photographed. The comparator develops at least two outputs, a first output corresponding to a high intensity of illumination and a second output corresponding to a low intensity of illumination. The first output is used to reduce the conduction angle of the thyristor and the second output is used to increase the conduction angle of the thyristor, to obtain more uniform illumination. Preferably, the comparator provides a third output when the intensity of illumination is within a narrow range or "window" intermediate the intensities at which the first and second outputs are produced and the conduction angle of the thyristor is kept unchanged when the third output is produced.

The thyristors used in the preferred embodiments are desirable when the power source is a conventional AC source. Other types of semiconductor switching devices and/or other types of power sources may be used. In any case the conduction angle is the fraction of each cycle of operation during which the switching device is conductive and it is controlled to control illumination.

In one embodiment, a triangular wave is generated and is compared with the output of the comparator to contol the time of switching of a thyristor and thereby control the conduction angle. In another embodiment, the conduction angle is controlled from a monostable or one-shot multivibrator which is controlled from an up/down counter, operable in a mode determined by the output of the comparator.

This invention contemplates other objects features and advantages which will become more fully apparent from the following detailed description taken in conjunction with the accompanying drawings.

DESCRIPTION OF THE PREFERRED EMBODIMENTS

Figure 1:
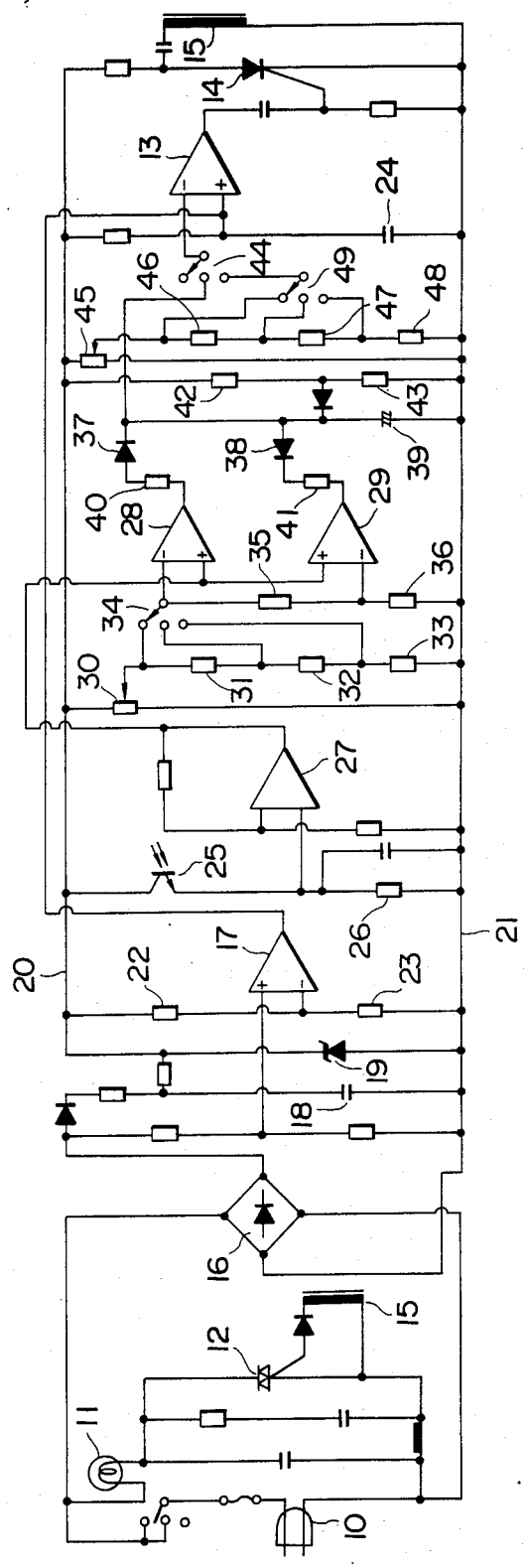
FIG. 1 is a schematic diagram of electrical circuitry of a preferred embodiment of the invention.

As shown schematically in FIG. 1, a plug 10 is connectable to an ordinary AC power source and has one prong connected through an on-off switch to one terminal of a lamp 11 the other terminal of which is connected through a thyristor 12 to the second prong of the plug 10, conventional resistor, capacitor and inductor elements being connected in circuit with the thyristor for protective and noise-prevention purposes. A gate or control electrode of the thyristor 12 is connected through a diode to a secondary winding of a pulse transformer 15. As shown at the right side of FIG. 1, an integrated circuit 13 has an output connected to the gate of an SCR switching device 14 which is connected in circuit with a primary winding of the pulse transformer 15. The SCR 14 is controlled from the leading edge of an output pulse developed by circuit 13 to operate in a conventional manner to control the discharge of a capacitor through the primary winding of transformer 15 and to develop a pulse in the secondary winding of transform 15 which is applied through the illustrated diode to the gate or control electrode of the thyristor 12 to initiate conduction thereof. Other types of driving circuits may be used for controlling the conduction of the thyristor 12 from the leading edge of the output pulse of circuit 13. The thyristor 12 of the embodiment of FIG. 1 is a bidirectional triode thyristor.

Figure 2:
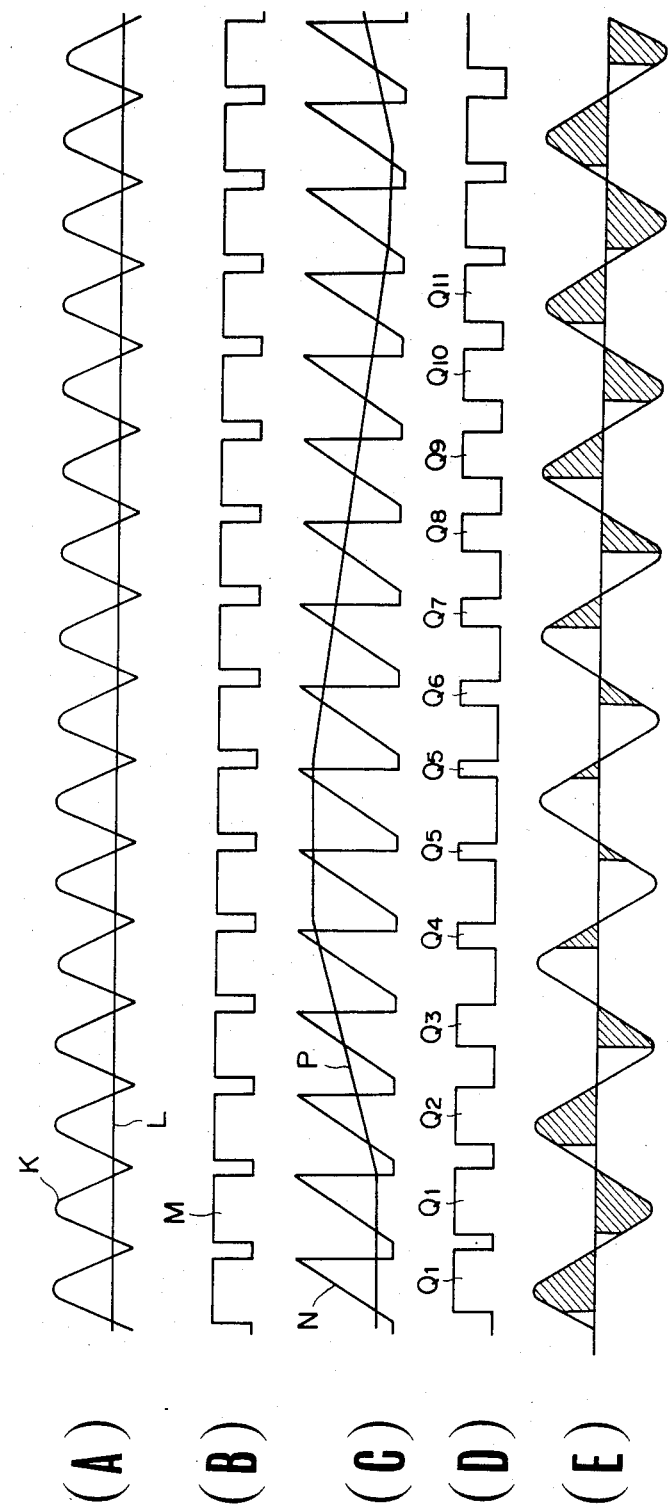
FIG. 2 is a waveform chart showing the waveforms of signals developed at certain points of the circuitry of FIG. 1.

A bridge rectifier 16 has input terminals connected to the plug 10 and has output terminals through a pair of resistors to a plus input of a comparator circuit 17, a full-wave rectified and unfiltered signal being thereby applied to the plus input of circuit 17. The output of rectifier 16 is also connected to conventional filtering and voltage-regulating circuitry, including a capacitor 18 and a Zener diode 19, to develop a regulated DC volatge between lines 20 and 21. The minus input of circuit 17 is connected through resistors 22 and 23 to lines 20 and 21 and the output of circuit 17 is connected to the plus input of comparator circuit 13, through a resistor to line 20 and through a capacitor 24 to line 21. In operation, the comparator circuit 17 compares the full-wave rectified signal applied to its plus input (K in FIG. 2(A)) with a DC reference level applied to its minus input (L in FIG. 2(A)) to develop a rectangular wave signal at its output (M in FIG. 2(B)). When the output of circuit 17 is low, capacitor 24 is discharged and when the output of circuit 17 is high capacitor 24 is gradually charged, to develop a signal having a triangular wave shape (N in FIG. 2 (C)). When the level of this signal exceeds the level of a signal applied to the minus input of comparator circuit 13, circuit 13 operates to control the SCR 14 and initiate conduction of the thyristor 12 which remains conductive until the end of a half cycle of the AC voltage applied to plug 10.

To control operation in response to illumination of a subject or object, a photometric circuit is provided which includes a phototransistor 25 which may be so disposed as to respond to light reflected from the subject or object or to otherwise respond to illumination of the subject or object. Phototransistor 25 is connected in series with a resistor 26 and to an input of a integrated circuit 27 connected to other components as shown to operate as an operational amplifier. Preferably, the luminosity factor of the phototransistor 25 is corrected, if necessary, to obtain a peak output at a wavelength of about 500 nm.

The output of the amplifier circuit 27 is connected to the plus inputs of two comparator circuits 28 and 29 which operate to develop two outputs, a first output corresponding to a high intensity of illumination and a second output corresponding to a low intensity of illumination. The first output is used to reduce the conduction angle of the thyristor 12 and the second output is used to increase the conduction angle of the thyristor 12, to obtain more uniform illumination. In addition, the comparators 28 and 29 provide a third output when the intensity of illumination is within a narrow range or "window" intermediate the intensities at which the first and second outputs are produced and the conduction angle of the thyristor is kept unchanged when the third output is produced.

To provide reference levels for the comparator circuits 28 and 29, a potentiometer 30 is connected between lines 20 and 21 and its movable contact or slider is connected through resistors 31, 32 and 33 to line 21. The minus input of circuit 28 is connected through a selector switch 34 either directly to the contact or slider of potentiometer 30 or to the junction between reistors 31 and 32 or to the junction between resistors 32 and 33. A pair of resistors 35 and 36 are connected in series between switch 34 and line 21, the junction therebetween being connected to the minus input of circuit 29. Switch 34 controls the reference levels at the minus inputs of circuits 28 and 29 to selectively obtain three different sensitivities or modes of operation, depending upon the intensity of the lamp 12 or depending upon the environment of use of the apparatus.

The cathode of a diode 37 and the anode of a diode 38 are connected through a capacitor 39 to the line 21 while the anode of diode 37 and the cathode of diode 38 are resepctively connected through resistors 40 and 41 to the outputs of circuits 28 and 29. A pair of resistors 42 and 43 are connected in series between lines 20 and 21, the junction therebetween being connected through a diode to the capacitor 39 and to charge the capacitor 39 to a certain level when neither of the diodes 37 or 38 is conductive.

In operation, when the output of the photometric circuit, at the output of circuit 27, is within a relatively narrow intermediate "window" range such that it is higher than the level at the minus input of circuit 29 and lower than the level at the minus input of circuit 29, the capacitor 39 is neither discharged through diode 38 nor charged through diode 37 and the capacitor 39 is maintained at a level established by the resistors 42 and 43. When the output of the photometric circuit is above the window range, the circuit 28 operates to charge the capacitor 39 through the diode 37 and resistor 40. When the output of the photometric circuit is below the window range, the circuit 29 operates to discharge the capacitor through the diode 38 and resistor 41. Thus the capacitor 39 is controlled in three modes, namely a charging mode, a discharging mode and a fixed-voltage mode, according to the output of the photometric circuit and according to the sensitively mode selected by operation of the switch 34.

A selector switch 44 is provided, connected to the minus input of circuit 13 and movable between an off position as shown, a position for automatic operation and a position for manual operation. In the automatic position, the minus input of cirucit 13 is connected to the capacitor 39. For manual operation, a potentiometer 45 is connected between lines 20 and 21 and its slider is connected to line 21 through three resistors 46, 47 and 48 in series. In the manual position of the switch 44, the minus input of circuit 13 is connected through a selector switch 49 to either the slider of potentiometer 45, the junction between resistors 46 and 47 or the junction between resistors 47 and 48. Thus the voltage applied to the minus input of circuit 13 may be manually controlled to obtain a wide range of adjustment of the time at which the triangular wave signal (N in FIG. 2 (C)) exceeds the voltage applied to the minus input of circuit 13.

In FIG. 2(C), P indicates the level of the voltage at the minus input of circuit 13 during automatic operation and during changes in illumination levels, this voltage being compared with the triangular wave signal N. As aforementioned, the triangular signal N is developed across the capacitor 24 which is discharged once during each half-cycle of the AC voltage from the power source, when the rectangular wave signal M is at a low level, i.e., when the level of the full-wave rectified signal K at the plus input of circuit 17 is below the DC reference level L at the minus input of circuit 17 (FIG. 2(A)).

When a subject or object is at a large distance from the lamp 11, the level of these signal P may be quite low as indicated at the left in FIG. 2(c), as a result of there being a low output from the photometric circuit. The triangular wave signal N then exceeds the signal P at an early time in each half-cycle and the width or duration of the pulses developed by the circuit 13 is quite large, as indicated by Q1 in FIG. 2(D). The leading edges of the pulses Q1 initiate conduction of the SCR 14 and trigger the thyristor 12 at early times, thereby obtaining a large conduction angle as shown in FIG. 2(E).

As the distance between the lamp 11 and the subject or object is decreased, the level of illumination is increased to increase the level at the output of the amplifier 27 and to shift the operation of the comparator circuitry to a high mode in which the comparator 28 operates to charge the capacitor 39 through the resistor 40 and diode 37. Thus the level of the voltage P rises, as indicated in FIG. 2(C), to gradually delay the start of operation of circuit 13 and to produce output pulses Q2, Q3, Q4 and Q5 of gradually reduced widths or durations as shown in FIG. 2(D), the conduction angles being correspondingly reduced, as shown in FIG. 2(E). Thus the intensity of the lamp 11 is reduced.

If the distance is kept at a short distance, the pluses Q5 produced by circuit 13 will continue to be of short duration. However, if the distance is increased, pulses Q6, Q7, Q8, Q9, Q10 and Q11 of gradually increasing durations will be produced, producing correponding gradual increases in the conduction angle and increased intensity at the lamp 11. Such operation is produced through operation of the comparator circuit 29 in a low mode in which its operates to discharge the capacitor 39 through the diode 38 and resistor 41.

Figure 3:
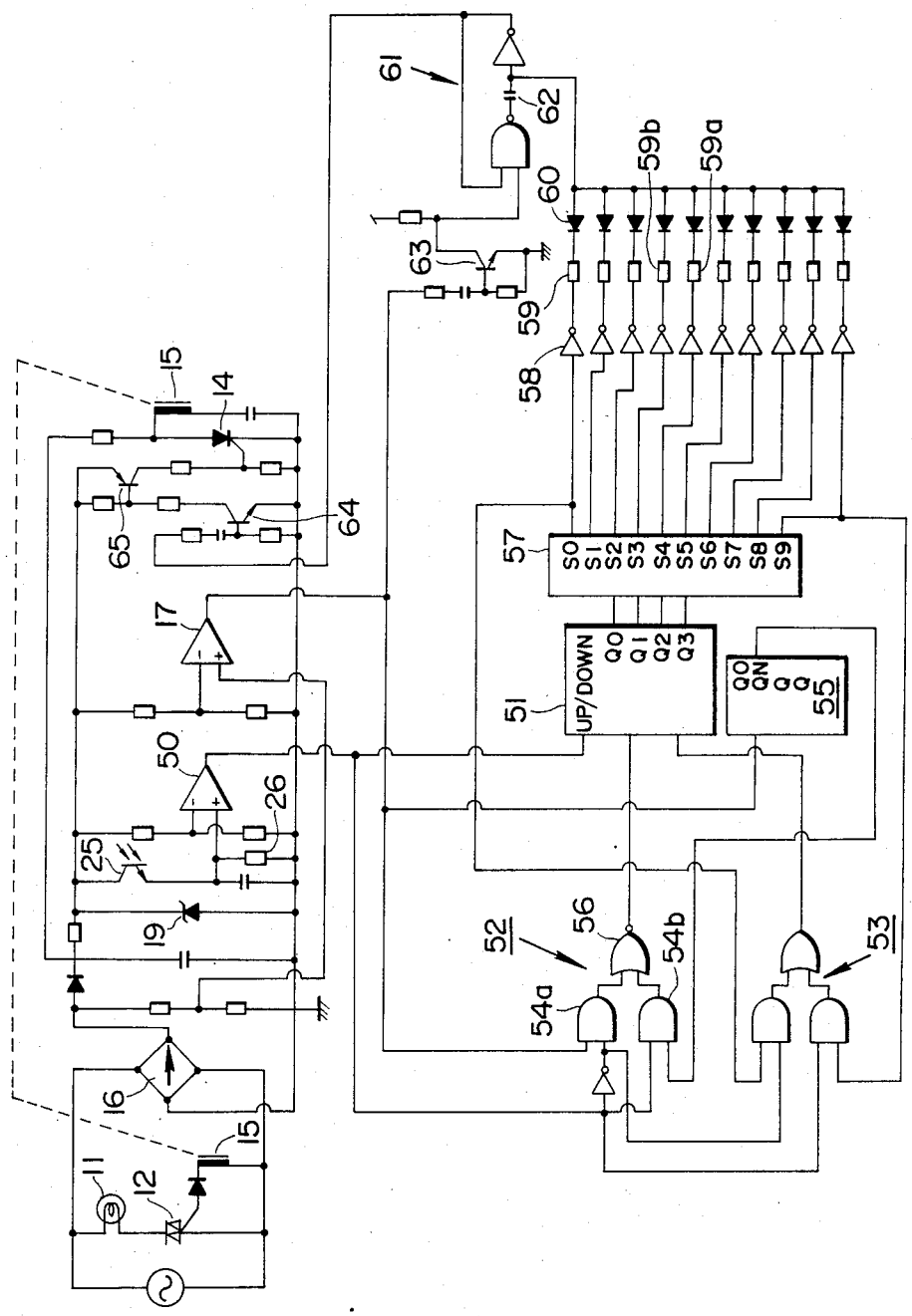
FIG. 3 is a schematic diagram of a second preferred embodiment of the invention.

FIG. 3 is a schematic diagram of circuitry of a second preferred embodiment of the invention in which digiatal circuitry is employed to control the conduction angle of the thyristor 12. Components having functions which are the same as in FIG. 1 are indicated by like reference numerals and the repeated description thereof is omitted.

In FIG. 3, a single integrated circuit 50 functions as a comparator, plus and minus inputs of circuit 50 being connected to photometric circuitry including phototransistor 25 in the same manner as the connections of inputs of amplifier circuit 27 in FIG. 1. Circuit 50 has only two modes, a high mode produced when the illumination level is above a certain value, and a low mode when the illumination level is below a certain value. The output of circuit 50 is connected to an up/down control terminal of an up/down counter 51 and it is also connected to a gate circuit 52 which is interconnected with a gate circuit 53. Gate circuit 52 has an input connected to the output of the comparator circuit 17 to receive the rectangular wave signal (M of FIG. 2(B)) and to apply a corresponding clock signal to the up/down counter 51. The gate circuit 53, when operative, functions in inhibit operation of the up/down counter 51.

The rectangular wave signal at the output of circuit 17 (M in FIG. 2(B)) is applied to an input of a gate 54a of the gate circuit 52 and also to an input of a frequency divider circuit 55 which functions to slow down the counting speed of the up/down counter 51. When the output of the circuit 50 is at a low level, an inverted rectangular wave clock signal M is applied to the counter 51. When the output of circuit 50 is at a high level, low frequency pulses are applied from the frequency divider 55 and through gates 54b and 56 to the up/down counter. As a result, a more rapid response is obtained when the illumination level is low and a less rapid or delayed response is obtained when the illumination level is high, to compensate for the responses which would otherwise be obtained as a result of the inherent characteristics of the lamp and the mode of energization thereof.

The up/down counter 51 of the illustrated embodiment is a BCD type of counter and its output is decoded by a decoder 57 to set one of the output terminals S0, S1, . . . S9 at a high level, corresponding to the registered count. The output terminals S0 and S9 of the decoder 57 are connected to the gate circuit 53 which operates to apply a count inhibiting or stopping signal to the counter 51 when the count is zero or nine and above. In the embodiment as illustrated in FIG. 3, the counter 51 counts only from zero to nine, but it will be understood that an up/down counter which counts to a higher number may advantageously be emplyed to permit use of a decoder having a greater number of output terminals.

The outputs of the decoder 57 are connected through ten inverters 58, ten resistors 59 and ten diodes 60 to a monostable or one-shot multivibrator 61 which includes a capacitor 62 connected as shown. The resistors 59 have progressively different values with the resistance of the resistor connected to terminal S0 having the smallest value and with the resistance of the resistor connected to terminal S9 having the highest value. Operation of the multivibrator 61 is initiated by a transistor 63 which is switched on by the leading edges of the rectangular wave signal M at the output of circuit 17. Initially, the output of the multivibrator 61 is at a low level. After a time interval determined by the value of the capacitor 62 and the value of the resistor 59 which is connected to the high output terminal of the decoder 57, the output of the multivibrator 61 is switched from a low level to a high level. The output of the multivibrator 61 is applied to the gate of SCR 14 through a driver circuit including transisotrs 64 and 65, the conduction angle of the thyristor 12 being thereby controlled from the output of the multivibrator 61.

With regard to the operation of the circuit of FIG. 3, it may be assumed that the up/down counter 51 registers a count of four and that the output terminal S4 is at a high level, so that the timing of the multivibrator 61 is controlled by the resistor connected to terminal S4, indicated by reference numeral 59a in FIG. 3, and a corresponding conduction angle is obtained. If the distance between the lamp 11 and the subject or object increases, the voltage developed across resistor 26 is decreased and the output of the circuit 50 is dropped to a low level. As a result, the rectangular wave signal M at the output of circuit 17 is applied through AND gate 54a and NOR gate 56 to apply pulses to the counter 51. At the same time, the output of the circuit 50 is applied to the counter 51 to cause it to count down. When the first pulse is applied, the count registered by counter 51 is reduced to three and the terminal S3 of the decoder 57 is placed in a high state so that the time constant of the multivibrator 61 is controlled by the resistor which is connected to terminal S3, designated by reference numeral 59b in FIG. 3.

Since the resistance of the resistor 59b is smaller than that of resistor 59a, the multivibrator 61 times out at an earlier time and the conduction angle of the thyristor 12 is increased. Consequently, the brightness of the lamp 11 is increased. If the distance should continue to increase, the count-down operation will continue, producing a further increase in the conduction angle.

However, if the distance should decrease to produce increased illumination at the phototransistor 25, the output of the circuit 50 will be switched to a high state to cause the counter 51 to operate as an up counter. The counter 51 is then operated by the leading edge of every pulse transmitted from the output of the divider circuit 55 through the gates 54b and 56, the count being increased in response to each transmitted pulse, to decrease the conduction angle.

As aforementioned, the divider 55 is provided to adjust the reponse speed. When the distance between the lamp 11 and the subject or object is decreased, the brightness of the lamp 11 is likewise decreased, to obtain a substantially fixed level of illumination.

Since the comparator 50 of the circuit of FIG. 3 has only two levels of operation, it is possible that at a fixed distance, the count registered by the counter will switch alternately between one count and the next lower or higher count, to produce a small alternating shift in the conduction angle. If such occurs and is found to be undersirable, a three level comparator such as used in the FIG. 1 embodiment may be used.

Thus in accordance with the invention, the intensity of illumintion of the object is measured and the brightness of the lamp is controlled on the basis of the measured intensity of illumination of the subject or object. The brightness of the lamp is diminished when the subject or object is illuminated excessively, while the brightness of the lamp is increased when the object is illuminated insufficiently. Accordingly, the intensity of illumination may be maintained at a substantially fixed level. An important advantage is that the subject or object will not be exposed either to excessive heat or dazzling brightness even when closely approaching the lamp.

In addition, a fast response speed is obtained and the disadvantage of the slow response speed of mechanical aperture adjusting devices are overcome. Rapid movements and changes in relative position of the lamp and the subject or object and interposed light-obstructions cna be accommodated without interfering with the desired photographic processes, and without creating objectional phenomena which might otherwise result.

It will be understood that modification and variations may be made without departing from the spirit and scope of the novel concepts of this invention.

What is claimed is:

1. A photographic lighting apparatus comprising a lamp; an AC power source which supplies power to the lamp; a thyristor provided between and connected to the lamp and the AC power source; a photometric circuit which measures the intensity of illumination of the object and generates a voltage corresponding to the measured intensity of illumination of the object; a comparator which receives the output voltage of the photometric circuit, compares the measured intensity of illumination of the object with a specific value and changes the output mode thereof at least when the intensity of illumination of the object is higher than the specific value and when the intensity of illumination of the object is lower than the specific value; and a conduction angle control circut connected to both the comparator and the thyristor to diminish the conduction angle of the thyristor when the output mode of the comparator corresponds to the intensity of illumination of the object being in excess of the specific value and to increase the conduction angle of the thyristor when the output mode of the comparator corresponds to the intensity of illumination of the object being lower than the specific value, wherein said comparator is capable of taking three output modes, namely, a high output mode, a moderate output mode and low output mode, according to the intensity of illumination of the object, and wherein said conduction angle control circuit is capable of diminishing the conduction angle when the output mode of the comparator is the high output mode, increases the conduction angle when the output mode is the low output mode and holds the existing conduction angle when the output mode of the comparator is the moderate output mode.

2. A photographic lighting apparatus comprising a lamp; an AC power source which supplies power to the lamp; a thyristor provided between and connected to the lamp and the AC power source; a photometric circuit which measures the intensity of illumination of the object and generates a voltage corresponding to the measured intensity of illumination of the object; a comparator which receives the output voltage of the photometric circuit, compares the measured intensity of illumination of the object with a specific value and changes the output mode thereof at least when the intensity of illumination of the object is higher than the specific value and when the intensity of illumination of the object is lower than the specific value; and a conduction angle control circuit connected to both the comparator and the thyristor to diminish the conduction angle of the thyristor when the output mode of the comparator corresponds to the intensity of illumination of the object being in excess of the specific value and to increase the conduction angle of the thyristor when the output mode of the comparator corresponds to the intensity of illumination of the object being lower than the specific value, wherein said comparator is capable of taking three output modes, namely, a high output mode, a moderate output mode and a low output mode, according to the intensity of illumination of the object, and wherein said conduction angle control circuit is capable of diminishing the conduction angle when the output mode of the comparator is the high output mode, increases the conduction angle when the output mode is the low output mode and holds the existing conduction angle when the output mode of the comparator is the moderate output mode, wherein said conduction angle control circuit comprises a condenser which is discharged when the output mode of the comparator is the low output mode, maintained at the charged voltage when the output mode of the comparator is the moderate output mode and is charged when the output mode of the comparator is the high output mode; a triangular wave generating circuit capable of generating triangular waves synchronously with the AC power source; and output circuit which receives the triangular waves generated by the triangular wave generating circuit as one input signal and receives the voltage of the condenser as another input signal to give an output signal every time the triangular wave crosses the voltage of the condenser; and a driving circuit which is actuated by the output waves of the output circuit to switch on the thyristor.

3. A photographic lighting apparatus comprising a lamp; an AC power source which supplies power to the lamp; a thyristor provided between and connected to the lamp and the AC power source; a photometric circuit which measures the intensity of illumination of the object and generates a voltage corresponding to the measured intensity of illumination of the object; a comparator which receives the output voltage of the photometric circuit, compares the measured intensity of illumination of the object with a specific value and changes the output mode thereof at least when the intensity of illumination of the object is higher than the specific value and when the intensity of illumination of the object is lower than the specific value; and a conduction angle control circuit connected to both the comparator and the thyristor to diminish the conduction angle of the thyristor when the output mode of the comparator corresponds to the intensity of illumination of the object being in excess of the specific value and to increase the conduction angle of the thyristor when the output mode of the comparator corresponds to the intensity of illumination of the object being lower than the specific value, wherein said comparator is capable of taking three output modes, namely, a high output mode, a moderate output mode and a low output mode, according to the intensity of illumination of the object, wherein said conduction angle control circuit includes an up/down counter which functions as an up counter or a down counter depending on the output mode of the comparator; and a one-shot multivibrator which switches on the thyristor by an output corresponding to a time constant selectively determined on the basis of the output of the up/down counter.

4. A photographic lighting apparatus comprising a lamp; an AC power source which supplies power to the lamp; a thyristor provided between and connected to the lamp and the AC power source; a photometric circuit which measures the intensity of illumination of the object and generates a voltage corresponding to the measured intensity of illumination of the object; a comparator which receives the output voltage of the photometric circuit, compares the measured intensity of illumination of the object with a specific value and changes the output mode thereof at least when the intensity of illumination of the object is higher than the specific value and when the intensity of illumination of the object is lower than the specific value; and a conduction angle control circuit connected to both the comparator and the thyristor to diminish the conduction angle of the thyristor when the output mode of the comparator corresponds to the intensity of illumination of the object being in excess of the specific value and to increase the conduction angle of the thyristor when the output mode of the comparator corresponds to the intensity of illumination of the object being lower than the specific value, wherein said comparator is capable of taking two output modes, namely, a high output mode and a low output mode, according to the intensity of illumination of the object, and wherein said conduction angle control circuit includes an up/down counter which functions as an up counter or a down counter depending on the output mode of the comparator; and a one-shot multivibrator which switches on the thyristor by an output corresponding to a time constant selectively determined on the basis of the output of the up/down counter.

5. A photographic lighting apparatus comprising a lamp; an AC power source which supplies power to the lamp; a thyristor provided between and connected to the lamp and the AC power source; a photometric circuit which measures the intensity of illumination of the object and generates a voltage corresponding to the measured intensity of illumination of the object; a comparator which receives the output voltage of the photometric circuit, compares the measured intensity of illumination of the object with a specific value and changes the output mode thereof at least when the intenstiy of illumination of the object is higher than the specific value and when the intensity of illumination of the object is lower than the specific value; and a conduction angle control circuit connected to both the comparator and the thyristor to diminish the conduction angle of the thyristor when the output mode of the comparator corresponds to the intensity of illumination of the object being in excess of the specific value and to increase the conduction angle of the thyristor when the output mode of the comparator corresponds to the intensity of illumination of the object being lower than the specific value, wherein said comparator is capable of taking three output modes, namely, a high output mode, a moderate output mode and a low output mode, according to the intensity of illumination of the object, and wherein said conduction angle control circuit is capable of diminishing the conduction angle when the output mode of the comparator is the high output mode, increases the conduction angle when the output mode is low output mode and holds the existing conduction angle when the output mode of the comparator is the moderate output mode, and wherein said conduction angle control circuit includes an up/down counter which functions as an up counter or a down counter depending on the output mode of the comparator; and a one-shot multivibrator which switches on the thyristor by an output corresponding to a time constant selectively determined on the basis of the output of the up/down counter.

* * * * *